United States Patent [19]

Perlman

[11] Patent Number: 4,665,990

[45] Date of Patent: May 19, 1987

[54] MULTIPLE-STAGE COAL SEAM FRACING METHOD

[76] Inventor: William Perlman, 2302 Niels Esperson Building, Houston, Tex. 77002

[21] Appl. No.: 788,324

[22] Filed: Oct. 17, 1985

Related U.S. Application Data

[63] Continuation-in-part of Ser. No. 631,592, Jul. 17, 1984, Pat. No. 4,566,539.

[51] Int. Cl.$^4$ .................. E21B 43/267; E21B 43/27
[52] U.S. Cl. ..................... 166/307; 166/280; 166/308
[58] Field of Search ............... 166/307, 308, 281, 282, 166/280

[56] References Cited

U.S. PATENT DOCUMENTS

| | | | |
|---|---|---|---|
| 2,774,431 | 12/1956 | Sherborne | 166/42 |
| 2,802,531 | 8/1957 | Cardwell | 166/42 |
| 3,149,674 | 9/1964 | Schutze | 166/42 |
| 3,167,123 | 1/1965 | Graham | 166/42 |
| 3,235,007 | 2/1966 | Kern | 166/42 |
| 3,349,851 | 10/1967 | Huitt | 166/42 |
| 3,374,835 | 3/1968 | Knox | 166/42 |
| 3,384,416 | 5/1968 | Ruehl | 299/16 |
| 3,412,797 | 11/1968 | Huitt | 166/42 |
| 3,433,740 | 3/1969 | Armentrout | 252/8.5 |
| 3,709,300 | 1/1973 | Pye | 166/280 |
| 3,768,564 | 10/1973 | Knox | 166/307 |
| 3,818,990 | 6/1974 | Coulter | 166/280 |
| 3,842,911 | 10/1974 | Knox | 166/42 |
| 3,918,524 | 11/1975 | Broaddus | 166/307 |
| 3,923,666 | 12/1975 | Dill | 252/8.55 |
| 3,934,651 | 1/1976 | Nierode | 166/282 |
| 3,954,142 | 5/1976 | Broaddus | 166/307 |
| 4,186,802 | 2/1980 | Perlman | 166/280 |
| 4,245,699 | 1/1981 | Steeman | 166/271 |
| 4,245,702 | 1/1981 | Haafkens | 166/307 |
| 4,283,089 | 8/1981 | Mazza | 299/16 |
| 4,305,464 | 12/1981 | Masszi | 166/370 |
| 4,471,840 | 9/1984 | Lasseter | 166/280 |
| 4,566,539 | 1/1986 | Perlman | 166/307 |

OTHER PUBLICATIONS

Lambert, S. W., et al., "Improved Methods for Monitoring Production from Vertical Degasification Wells," U.S. BOM, R.I. 8309, (1978).
Lambert, S. W. et al., "Methane Drainage: Experience With Hydraulic Stimulation Through Slotted Casing," U.S. BOM, R.I. 8295, (1978).
Trevits, M. A., et al., "Methane Drainage: Identification and Evaluation of the Parameters Controlling Induced Fracture Geometry," SPE/DOE 10820, (1982).
Lambert, S. W., et al., "Methane Drainage Ahead of Mining Using Foam Stimulaton," U.S. DOE, RI-PMT-C-3, (1979).

*Primary Examiner*—Stephen J. Novosad
*Assistant Examiner*—Bruce M. Kisliuk
*Attorney, Agent, or Firm*—Pravel, Gambrell, Hewitt & Kimball

[57] ABSTRACT

An improved method of multiple-stage hydraulic fracturing of coal seams to improve the rate and total recovery of gas therefrom. In one aspect, the improvement comprises completing the well with 7-inch or larger casing and 3½ inch or larger tubing. In another aspect, the stagewise fracturing is continued until the following quantity of 60–140 mesh proppants has been deposited in the formation:

| | | |
|---|---|---|
| for | $5 \leq h < 10$, | $m \geq 500,000$; |
| for | $10 \leq h < 15$, | $m \geq 750,000$; |
| for | $15 \leq h < 20$, | $m \geq 1,000,000$; |
| for | $20 \leq h < 25$, | $m \geq 2,000,000$; and |
| for | $h \geq 25$, | $m \geq 3,000,000$; | wherein h is the vertical thickness of the coal seam in feet and m is the minimum quantity of the fine proppants in pounds deposited therein. In another aspect, a coal seam fractured by the multiple-stage method is refractured after producing or shutting in the well for a period of time to permit closure of the fractures on the proppant placed therein in the earlier multiple-stage fracturing of the coal seam.

30 Claims, No Drawings

MULTIPLE-STAGE COAL SEAM FRACING METHOD

CROSS REFERENCE TO RELATED APPLICATION

This application is a continuation-in-part of my copending application U.S. Ser. No. 631,592, entitled "Coal Seam Fracing Method," filed July 17, 1984 now U.S. Pat. No. 4,566,539.

FIELD OF THE INVENTION

This invention pertains to hydraulic fracturing of subterranean gas-containing coal formations, i.e. coal seams, for the purpose of increasing the producing rate and total amount of recovery of gas from a well completed in such a formation, and more particularly to certain improvements in multiple-stage fracing for facilitating the procedure and for obtaining extensive propped fractures within the coal seam.

BRIEF DESCRIPTION OF THE PRIOR ART

Hydraulic fracturing techniques for hydrocarbon formations are well known and have been extensively used for increasing the recovery of oil and gas from hydrocarbon bearing formations. These techniques involve injecting a fracing fluid down the wellbore and into contact with the formation to be fractured. Sufficiently high pressure is applied to the fracing fluid to initiate and propagate a fracture into the formation. Propping materials are generally entrained in the fracing fluid and deposited in the fracture to maintain the fracture open during production.

A hydraulic fracturing technique particularly well suited for fracturing low permeability (10 millidarcies or less) gas bearing sandstone formations is described in U.S. Pat. No. 4,186,802. This method includes multiple fracing stages carrying a fine proppant sand of between 60 to 140 mesh size in a sand to fluid ratio mix of 4 pounds/gallon or higher. Each carrier stage is immediately followed by a corresponding spacer stage comprising the fracing fluid without a proppant added. Immediately following the final carrier stage and corresponding spacer stage, a terminating stage carrying a medium proppant sand of a 20 to 40 mesh size is injected, followed by a fracing fluid flush of the tubing string. The fracing fluid was made up of up to 70 percent alcohol by volume in order to reduce the water volume of the fracing fluid which adversely reacted with water sensitive clays within the formation. Up to 20 percent liquified $CO_2$ by volume was combined with the frac water/alcohol mixture to further reduce the water volume.

Coal seams differ from typical subsurface formations from which hydrocarbons are normally recovered, such as carbonate or a sandstone formations. Coal seams are typically much more friable than carbonates or sandstones. Thus, when conventional fracing methods are used, the proppants normally used have a tendency to generate small coal particles from the faces of the fracture which become mixed with the proppant. When the well is put into production, additional coal particles tend to slough off of the faces of the fractures into the proppant. The presence of the coal particles in the proppant tends to plug off the interstitial spaces between the proppant particles and concomitantly reduces the conductivity of the propped fracture. The coal particles also adversely affect the functioning of surface separating and processing equipment.

In addition, coal seams are subject to plastic deformation. When conventional 20-40 mesh proppants are used, they are abrasive to the fracture faces. Proppants in the fracture faces and the creep of the coal into the fracture results in reducing the width and conductivity of the fracture.

Further, conventional fracturing techniques result in wider fractures at the lowermost portion of the coal seam which narrow as they near the uppermost portion of the coal seam, limiting communication between the upper portions of the coal seam and the fracture. Further complicating the fracture of coal seams, the coal seams are typically saturated with water having a high carbonate concentration. Conventional fracing results in precipitation of the carbonates, further reducing the permeability of the formation at the fracture faces.

My copending application, U.S. Ser. No. 631,592, filed July 17, 1984, provides a method for generating fractures within a subsurface coal seam which have an improved conductivity, an increased production rate and an increased total recovery of gas therefrom in comparison with methods previously attempted for fracturing coal seams.

My copending application U.S. Ser. No. 631,592, filed July 17, 1984, is directed to a method for generating fractures within a subsurface coal seam which have an improved conductivity and more uniform width. Broadly, the method comprises injecting stagewise into the formation adjacent the well a proppant-containing fracing fluid alternated with an acidizing solution.

In application U.S. Ser. No. 631,592, filed July 17, 1984, the fracing fluid has suspended therein fine proppants with a particle size distribution substantially between 60 and 140 mesh (all mesh sizes herein refer to the U.S. standard sieve series), preferably averaging 100 mesh. The proppants are present in the initial fracing fluid injection stages in an amount ranging from about 0 to about 4 pounds per gallon of fracing fluid. The proppant loading in the fracing fluid is increased in subsequent injection staqes until the fracing fluid contains from about 8 to about 12 pounds of proppant per gallon of fluid. Thereafter, the fracing fluid injections are continued at the higher proppant loading. Each fracing fluid stage is immediately followed by injection of an acidizing solution into the formation adjacent the well.

In application U.S. Ser. No. 631,592, filed July 17, 1984, the alternating injections of fracing fluid and acid are performed at a rate of from about 15 to about 35 barrels per minute, preferably 20 to 30 barrels per minute, and continuing until at least 3,000 pounds of the fine proppants have been deposited in the formation fracture per vertical foot of the coal seam. Preferably, the terminal injection stage of proppant-containing fracing fluid is followed by a proppant-free fracing fluid or acidizing solution flush of the tubing string.

In application U.S. Ser. No. 631,592, filed July 17, 1984, the fracing fluid is preferably water from the coal seam or adjacent formation to which a gelling agent is added at the rate of about 30 pounds per 1,000 gallons. The acid may be any acid typically used for treating subsurface formations, such as acetic, formic, hydrofluoric, or sulfamic, but is preferably hydrochloric acid. Additionally, the fracing fluid or acidizing solution may contain surfactants, suspending agents, sequestering agents, anti-sludge agents, or corrosion inhibitors.

SUMMARY OF THE INVENTION

The present invention is directed to certain improvements in a method of injecting stagewise into a subsurface coal seam adjacent a well a proppant-containing fracing fluid alternated with a proppant-free fluid which is preferably an acidizing solution.

In one aspect of the invention, it has been found that the fracturing procedure is facilitated by providing the well with casing of at least 7 inches in nominal diameter and with tubing of at least 3½ inches in nominal diameter. The fracing fluid is then placed in the formation through perforations in the casing.

In another aspect of the invention, extensive propped fractures are obtained within the coal seam by continuing the stagewise alternating injections of fracing fluid and acid until a minimum quantity of fine proppants has been deposited in the formation according to the following:

| | | |
|---|---|---|
| for | $5 \leq h < 10$, | $m \geq 500,000$; |
| for | $10 \leq h < 15$, | $m \geq 750,000$; |
| for | $15 \leq h < 20$, | $m \geq 1,000,000$; |
| for | $20 \leq h < 25$, | $m \geq 2,000,000$; and |
| for | $h \geq 25$, | $m \geq 3,000,000$; | wherein h is the vertical thickness of the coal seam in feet and m is the minimum quantity of fine proppants in pounds deposited therein.

In still another aspect of the invention, a fractured coal seam, preferably fractured by stagewise multiple injections of proppant-containing fracing fluid alternated with an acidizing solution, is refractured by the multiple-stage fracturing method.

DESCRIPTION OF THE PREFERRED EMBODIMENTS

As used herein unless otherwise indicated by context, the term "multiple-stage fracing method" and words of like import are used in reference to a method comprising injecting stagewise into the formation adjacent the well a proppant-containing fracing fluid alternated with a proppant-free fluid. For purposes of clarity, this method is first set out below so that the improvements therein will be better understood.

1. Multiple-Stage Fracing

The multiple-stage fracing method of the present invention can be carried out by any conventional apparatus used for previously known methods of hydraulic fracturing. Conventional proppant-water mixing equipment and pumping equipment may be utilized in performing the method. In my earlier copending application U.S. Ser. No. 631,592, I preferred to complete the well through the coal seam by conventional open-hole techniques to avoid the problem of sand-out which can occur when the fracing fluid must flow through casing perforations, especially at the higher proppant loading in the method of the invention. Normally, the shales of the strata overlying and underlying the coal seam are of sufficient hardness to confine the fracture to the coal seam.

Although it is possible to use water or other fluid from any suitable source, the fracturing fluid preferably used in carrying out the present method is water produced from the coal seam or adjacent formation to which is added conventional gels, such as, for example, guar gum, modified guar gums, polysaccharide derivatives, cellulose derivatives, or synthetic polymers, to obtain a sufficient viscosity to suspend the proppants. Preferably, a substituted guar gum such as HPG (hydroxy propyl guar gum) sold under the designation of WG11 by Halliburton or WG-A2 by Smith Energy is added at the rate of about 30 pounds per 1,000 gallons of formation water.

Proppant is added to the fracing fluid in the initial stage at a rate ranging from about 0 (proppant-free) to about 4 pounds per gallon of fracing fluid.

The succeeding stages have a proppant loading of from about 2 to about 4 pounds per gallon of fluid initially which is incrementally increased in succeeding stages to a proppant loading of from about 8 to about 12 pounds per gallon of fluid. Each incremental increase of proppant loading of the succeeding stages is preferably from about 0 to about 3 pounds per gallon. Thereafter, the proppant loading is at the 8-12 pounds per gallon rate, preferably about 10 pounds per gallon.

The proppant has a particle size distribution substantially between 60 and 140 mesh, preferably averaging 100 mesh. Preferably, the proppant is spherically shaped rather than angularly shaped. Oklahoma 100 mesh sand has been found suitable for most applications.

The proppant-containing fracing fluid is injected into the formation in multiple stages. The rate of injection may range from about 15 to about 35 barrels per minute, but best results are obtained at an injection rate of 20-30 barrels per minute. The volume of each fracing fluid injection stage is determined in advance thereof and depends on the size of the fracture desired and the pressure and flow resistance. Normally, 2,000-8,000 gallons per stage produce suitable results. Preferably, the volume of the initial fracing fluid injection stage is from about 2,000 to about 4,000 gallons, and the volume is increased in each following injection stage, as the sand loading is increased, to from about 6,000 to about 8,000 gallons, preferably 7,000 gallons, for subsequent and terminal fracing fluid injection stages. In my earlier application, the stages are continued until at least about 3,000 pounds of proppant have been deposited in the formation fracture per vertical foot of the coal seam.

The fine, spherical proppant is believed to serve several functions in the method. As it is injected into the fracture, the spherical shape of the proppant substantially reduces abrasion to the face of the fracture, thereby largely eliminating the problems associated with particles of coal becoming mixed with the proppant. Additionally, spherical proppants having a small particle size exhibit less tendency to become embedded in the face of the fracture and inhibit creep of the coal into the propped fracture. When the pressure on the fracing fluid is reduced and the formation face is allowed to compress the proppants, the proppant particles in the fractures provide a formation consolidating effect, similar to that of gravel packing in a well completed in a poorly consolidated formation, by filtering out the coal particles which would otherwise slough off of the fracture faces and plug the interstitial spaces between the proppant particles. The permeability of fine proppants is much greater than that of the coal seam. Thus, if the fracture is wide enough, the conductivity of the propped fracture is sufficient to improve production and overall recovery of gas from the well.

Immediately following each proppant-containing fracing fluid injection stage, proppant-free fluid is injected into the formation. While the proppant-free fluid may in some instances be the same as the fracing fluid without proppant, or another fluid suitable for carrying proppants as described above, the proppant-free fluid is preferably an acidizing solution. The acidizing solution may contain any conventional acid normally used for treating subsurface formations at typical concentrations. These acids include acetic acid, formic acid, hydrofluoric acid or sulfamic acid. Suitable results are obtained with an aqueous acidizing solution containing 15 percent by weight hydrochloric acid. The acid solution may also contain conventional additives such as surfactants, suspending agents, sequestering agents, anti-sludge agents, or corrosion inhibitors. If desired, the proppant-free fluid may contain up to about 1 pound of proppant per gallon of solution. For convenience, the proppant-free fluid is referred to hereinbelow as acid or acidizing solution with the understanding that other proppant-free fluids may be suitable in some instances.

The acid is injected into the formation at about the same rate as the fracing fluid injection stages. The volume of acidizing solution injected depends on the size of the fracture and pressure and flow resistance, but injection of from about 250 to about 1500 gallons of an acidizing solution of 15 percent by weight hydrochloric acid between each fracing fluid stage is suitable for most fractures. In my earlier application, I preferred acidizing fluid injection stages having a volume of about 750 gallons each, but have now found that a volume of about 500 gallons of the acidizing solution injected between each proppant-containing fracing fluid injection stage is more preferred. Also, in my earlier application, I preferred to treat the formation with 500–3000 gallons of the acidizing solution prior to the injection of the initial fracing fluid stage. It has now been found that the formation is more preferably treated with 2000–4000 gallons of the acidizing solution prior to the injection of the initial fracing fluid stage.

The acid is believed to serve several functions in the method. Because the acidizing solution is less dense than the fracing fluid, it tends to flow above the fracing fluid and sand deposited in the lower portion of a vertical fracture, widening and vertically extending the upper portion of the fracture. The acidizing solution also has a tendency to divert from existing fractures and to initiate new fractures which are filled with proppant during the subsequent fracing fluid injection stages. Finally, the acid cleans the well bore and fracture faces by solubilizing any precipitates or contaminants due to drilling or completion fluids or cement which may be present at or adjacent the well bore or fracture faces.

It is important in sand out situations that the pressure not be allowed to increase excessively because of the danger of fracturing the underlying or overlying non-producing formations. It is also important to immediately take preventative measures whenever sand out is threatened because of the danger of sanding out the well and having to abort the fracturing operation.

Working examples of the multiple-stage fracing method described above are set forth in my copending application U.S. Ser. No. 631,592, filed July 17, 1984, which is hereby incorporated herein by reference.

2. Well Completion Improvements

It has now been discovered that, in the multiple-stage fracing method, the fracturing fluid can be injected into the coal seam through perforations in casing installed in the well without observing a substantially greater incidence of sand-out than is experienced when the well is completed by open-hole techniques. The casing should have a nominal size of at least 7 inches, i.e. an outside diameter of 7 inches or more. The fracture is confined to the coal seam by the location of the perforations and by utilizing tubing packers in the conventional manner.

The production tubing should have a nominal size of at least $3\frac{1}{2}$ inches and an inside diameter of at least 2.875 inches. This relatively large tubing size minimizes any problems which are otherwise experienced when the proppant-containing fracing fluid is injected through smaller-sized tubing. In addition, this larger tubing size reduces friction during the fracing fluid injection, permitting a lower injection pressure and flow rate.

Also, plugging of the tubing during later production of gas from the fractured coal seam due to entrained coal fines is also minimized when the aforementioned casing and tubing sizes are employed. The casing substantially prevents sloughing of coal particles from the coal seam exposed to the well. While the quantity of coal fines produced with the gas through the propped fractures obtained by the multiple-stage fracing method is drastically reduced in comparison to coal seams which have been fractured by other methods, there is sometimes a sufficient quantity of coal fines produced with the gas to foul smaller production tubings. This problem is largely avoided by utilizing tubing of the aforementioned size.

In production of gas from a coal seam fractured by the multiple-stage fracing method, the annular space between the tubing and casing of the aforementioned sizes has an additional useful purpose. During production of gas from coal seams, the well is generally slowly filled with water from the reservoir which eventually reduces the rate of gas production below that desired. In the present well completed with the tubing and casing, the reduction in gas production is not observed to be as rapid because water entering the well from the coal seam is accumulated in the relatively large annular space.

In addition, when the gas production rate does eventually decline, it can conveniently be restored by blowing, "rocking," or otherwise displacing the water accumulated in the annular space with an inert gas such as nitrogen. The gas is forced into the annular space at the wellhead and in turn forces the water to the surface through the production tubing. For the water accumulation and displacement technique, it has been found that $3\frac{1}{2}$ inch tubing and 7-inch casing are preferred over substantially larger or smaller sizes.

3. Extensive Fracturing

Quite surprisingly, it has also been discovered that extensive propped fractures can be formed in coal seams. In contrast to other types of hydrocarbon-bearing formations in which elaborate techniques must be used to place similar quantities of proppants therein, to obtain extensive propped fractures within a coal seam formation adjacent a well, the multiple-stage fracing method described above is continued, or performed a plurality of times, until very large quantities of proppant have been deposited in the formation. The minimum quantity of the fine proppants deposited in the formation to obtain the extensive fracturing depends primarily on the vertical thickness of the coal seam as follows:

for  $5 \leq h < 10$, $m \geq 500{,}000$;

| | -continued | |
|---|---|---|
| for | 10 ≦ h < 15, m ≧ | 750,000; |
| for | 15 ≦ h < 20, m ≧ | 1,000,000; |
| for | 20 ≦ h < 25, m ≧ | 2,000,000; and |
| for | h ≧ 25, m ≧ | 3,000,000; | wherein h is the vertical thickness of the coal seam in feet and m is the minimum quantity of fine proppants in pounds deposited therein.

Placement of such very large quantities of proppant within the coal seam results in an extensive network of propped fractures within the coal seam. This extensive fracturing of the coal seam has many advantages, including increases in both the rate of gas production and the overall recovery of gas from the well completed in the coal seam. The width of the propped fractures is increased, reducing the flow resistance so that the rate of gas production can be dramatically increased relative to that of coal seams in which only 3,000–15,000 pounds of proppant have been placed per foot of coal seam pay. The length and/or number of propped fractures is increased, permitting a dramatic increase in the total gas recovered from the well, and also permitting a larger spacing between wells.

4. Refracturing

The multiple-stage fracing method may be performed a plurality of times on the same coal seam, even through the same perforations in the casing. Between each fracing operation, the fractures formed in the coal seam are permitted to close on the proppant deposited therein, i.e. the well is either shut in or produced.

In contrast to other types of hydrocarbon-bearing formations, coal seams can be refractured any number of times without damaging the formation. The refracturing of coal seams, quite surprisingly, does not result in the proppant screening out on the formation face, in plugging of the well with proppant, or merely in the proppant being deposited between the casing and the well bore face, as usually occurs in refracturing hydrocarbon-bearing sandstone or carbonate formations. Typically, refracturing coal seams with the multiple-stage fracturing method re-opens, widens, and horizontally extends the existing propped fractures, but formation of new fractures in the coal seam can also occur.

The ability to refracture coal seams is a significant discovery in several respects. For example, in the extensive fracturing of coal seams described above, it may not be possible, or it may be very inconvenient, to have available at one time all of the sand required to extensively fracture the coal seam as described above. When this happens, the multiple-stage fracturing operation must be interrupted before the desired quantity of proppant can be deposited in the formation.

In addition, a coal seam which has previously been fractured with conventional quantities of proppants can be refractured with the multiple-stage fracturing method to obtain extensive propped fractures within the coal seam. In this manner, the rate and total recovery of gas from the well completed in the previously fractured formation can be dramatically increased. While the refracturing method can be used to treat coal seams previously fractured by other methods which may or may not have been successful in improving the rate and extent of gas recovery from the well penetrating the formation, best results are obtained when the previous fracturing method is the multiple-stage fracturing method.

The foregoing disclosure and description of the invention are illustrative and explanatory thereof, and various changes in the size, shape and materials, as well as in the details of the illustrated process may be made without departing from the spirit of the invention.

I claim:

1. A method for fracturing a gas-containing subsurface coal formation penetrated by a well, comprising the steps of:

providing the well with casing of at least 7 inches in nominal diameter having perforations adjacent the coal formation;

injecting a fracing fluid through said perforations into the formation adjacent the well in a multiplicity of stages, said fracing fluid having suspended therein fine proppants with a particle size distribution substantially between 60 and 140 mesh, said fine proppants added to said fluid at a rate ranging from about 2 to about 12 pounds per gallon of said fluid; and injecting an acidizing solution into the formation adjacent the well immediately following each of said fracing fluid injection stages, said injections of fracing fluid and acidizing solution being at a rate of from about 15 to about 35 barrels per minute and continuing until at least 3,000 pounds of said fine proppants have been deposited in the formation fracture per linear vertical foot of the formation.

2. A method for fracturing a gas-containing subsurface coal formation penetrated by a well, comprising the steps of:

providing the well with casing of at least 7 inches in nominal diameter having perforations adjacent the coal formation, and with tubing of at least 3½ inches in nominal diameter in fluid communication with the well adjacent the coal formation;

injecting an initial stage of fracing fluid through said perforations into the formation adjacent the well, said fracing fluid having fine proppants suspended therein at a loading of from about 0 to about 4 pounds per gallon of said fluid, said proppants having a particle size distribution substantially between 60 and 140 mesh;

injecting a plurality of successive stages of fracing fluid through said perforations into the formation, said fracing fluid having said proppants suspended therein initially at a loading of from about 2 to about 4 pounds per gallon of fluid, said proppant loading being incrementally increased in succeeding fracing fluid injection stages to a proppant loading of from about 8 to about 12 pounds per gallon of fluid, said injection of said fracing fluid injection stages thereafter continuing at said 8–12 pounds per gallon proppant loading until at least 3000 pounds of said proppants have been deposited in the formation per linear vertical foot of formation; and injecting stages of acidizing solution through said perforations into the formation adjacent the well between said fracing fluid injection stages, each of said acidizing solution and said fracing fluid stages being injected at a rate of from about 15 to about 35 barrels per minute.

3. A method for fracturing a gas-containing subsurface coal formation penetrated by a well, comprising the steps of:

providing the well with casing of about 7 inches outside diameter having perforations adjacent the coal formation, and with tubing of about 3½ inches outside diameter and about 2.875 inches inside diameter in fluid communication with the well adjacent said perforations;

injecting an initial stage of acidizing solution through said perforations into the formation, said initial acidizing solution stage having a volume of from about 2000 to about 4000 gallons;

thereafter injecting an initial stage of from about 1000 to about 4000 gallons of fluid containing gelling agents through said perforations into the formation, said fracing fluid having fine proppants suspended therein at a loading of from about 0 to about 4 pounds per gallon of said fluid, said fine proppants being substantially spherically shaped and having an average particle size of about 100 mesh;

injecting a plurality of successive stages of a volume of fracing fluid containing gelling agents through said perforations into the formation, said volume of fracing fluid in each stage being initially from about 1000 to about 4000 gallons per stage, said fracing fluid volume being increased in succeeding fracing fluid injection stages at a rate of from about 0 to about 3000 gallons per stage until from about 5000 to about 10,000 gallons of said fracing fluid are injected per stage, said fracing fluid injection stages continuing thereafter at said 5000–10,000 gallon fracing fluid volume, said fracing fluid having said fine proppants suspended therein initially at a loading of from about 2 to about 4 pounds per gallon of fluid, said proppant loading being incrementally increased by from about 0 to about 3 pounds of said proppant per gallon of fracing fluid to a proppant loading of from about 8 to about 12 pounds per gallon of fracing fluid, said injection of said fracing fluid injection stages thereafter continuing at said 8–12 pounds per gallon proppant loading until at least 3000 pounds of said proppants have been deposited in the formation per vertical foot thereof; and injecting stages of from about 250 to about 1500 gallons each of acidizing solution through said perforations into the formation adjacent the well between said fracing fluid injection stages, each of said acidizing and said fracing fluid injection stages being injected at a rate of from about 15 to about 35 barrels per minute.

4. A method for fracturing a gas-containing subsurface coal formation penetrated by a well, comprising the steps of:

injecting a fracing fluid into the formation adjacent the well in a multiplicity of stages, said fracing fluid having suspended therein fine proppants with a particle size distribution substantially between 60 and 140 mesh, said fine proppants added to said fluid at a rate ranging from about 2 to about 12 pounds per gallon of said fluid; and injecting a substantially proppant-free fluid into the formation adjacent the well immediately following each of said fracing fluid injection stages, said injections of fracing fluid and proppant-free fluid being at a rate of from about 15 to about 35 barrels per minute and continuing until the following quanitites of said fine proppants have been deposited in the formation fracture:

| for | $5 \leq h < 10$, $m \geq$ 500,000; |
| for | $10 \leq h < 15$, $m \geq$ 750,000; |
| for | $15 \leq h < 20$, $m \geq$ 1,000,000; |
| for | $20 \leq h < 25$, $m \geq$ 2,000,000; and |
| for | $h \geq 25$, $m \geq$ 3,000,000; | wherein h is the vertical thickness of the coal seam in feet and m is the minimum quantity of said fine proppants in pounds deposited therein.

5. The method of claim 4, wherein said fine proppants comprise spherically shaped particles.

6. The method of claim 4, wherein said fracing fluid is formation fluid containing about 30 pounds gelling agent per 1,000 gallons of fracing fluid.

7. The method of claim 4, wherein said proppant-free fluid is acidizing solution.

8. The method of claim 7, wherein said acidizing solution is about 15 percent by weight aqueous hydrochloric acid.

9. The method of claim 4, wherein said injection rate is from about 20 to about 30 barrels per minute.

10. The method of claim 4, further comprising the steps of:

injecting a terminal stage of said fracing fluid having suspended therein said proppants added to said fluid at a rate of from about 8 to about 12 pounds per gallon of said fluid; and immediately following said injection of said terminal stage, injecting a flushing stage of proppant-free fluid.

11. A method for fracturing a gas-containing subsurface coal formation penetrated by a well, comprising the steps of:

injecting an initial stage of fracing fluid into the formation adjacent the well, said fracing fluid having fine proppants suspended therein at a loading of from about 0 to about 4 pounds per gallon of said fluid, said proppants having a particle size distribution substantially between 60 and 140 mesh;

injecting a plurality of successive stages of fracing fluid into the formation, said fracing fluid having said proppants suspended therein initially at a loading of from about 2 to about 4 pounds per gallon of fluid, said proppant loading being incrementally increased in succeeding fracing fluid injection stages to a proppant loading of from about 8 to about 12 pounds per gallon of fluid, said injection of said fracing fluid injection stages thereafter continuing at said 8–12 pounds per gallon proppant loading until the following quanitites of said proppants have been deposited in the formation:

| for | $5 \leq h < 10$, $m \geq$ 500,000; |
| for | $10 \leq h < 15$, $m \geq$ 750,000; |
| for | $15 \leq h < 20$, $m \geq$ 1,000,000; |
| for | $20 \leq h < 25$, $m \geq$ 2,000,000; and |
| for | $h \geq 25$, $m \geq$ 3,000,000; | wherein h is the vertical thickness of the coal seam in feet and m is the minimum quantity of said fine proppants in pounds deposited therein; and injecting stages of acidizing solution into the formation adjacent the well between said fracing fluid injection stages, each of said acidizing solution and said fracing fluid stages being injected at a rate of from about 15 to about 35 barrels per minute.

12. The method of claim 11, wherein said proppants are spherically shaped particles.

13. The method of claim 11, wherein said particles are sand having an average particle size of about 100 mesh.

14. The method of claim 11, wherein said fracing fluid injection stages have a volume of from about 1000 to about 10,000 gallons per stage.

15. The method of claim 11, wherein said acidizing solution injection stages have a volume of from about 250 to about 1500 gallons per stage.

16. The method of claim 11, wherein said incremental increase in proppant loading is from about 0 to about 3 pounds of proppant per gallon of fluid.

17. The method of claim 11, wherein said volume of said fracing fluid injection stages is initially from about 1000 to about 4000 gallons per stage, said volume being incrementally increased in succeeding fracing fluid injection stages to from about 5000 to about 10,000 gallons per stage, said fracing fluid injection stages continuing thereafter at said 5000-10,000 gallons per stage volume.

18. The method of claim 17, wherein said incremental increase in stage volume is from about 0 to about 3000 gallons per stage.

19. The method of claim 11, wherein said fracing fluid is formation water containing about 30 pounds gelling agent per 1000 gallons of said water.

20. The method of claim 11, wherein said acidizing solution is about 15 percent by weight aqueous hydrochloric acid.

21. The method of claim 11, wherein said injection rate is from about 20 to about 30 barrels per minute.

22. A method for fracturing a gas-containing subsurface coal formation penetrated by a well, comprising the steps of:
providing the well with casing of about 7 inches outside diameter having perforations adjacent the coal formation, and with tubing of about $3\frac{1}{2}$ inches outside diameter and about 2.875 inches inside diameter in fluid communication with the well adjacent said perforations;
injecting an initial stage of acidizing solution through said perforations into the formation, said initial acidizing solution stage having a volume of from about 2000 to about 4000 gallons;
thereafter injecting an initial stage of from about 1000 to about 4000 gallons of fluid containing gelling agents through said perforations into the formation, said fracing fluid having fine proppants suspended therein at a loading of from about 0 to about 4 pounds per gallon of said fluid, said fine proppants being substantially spherically shaped and having an average particle size of about 100 mesh;
injecting a plurality of successive stages of a volume of fracing fluid containing gelling agents through said perforations into the formation, said volume of fracing fluid in each stage being initially from about 1000 to about 4000 gallons per stage, said fracing fluid volume being increased in succeeding fracing fluid injection stages at a rate of from about 0 to about 3000 gallons per stage until from about 5000 to about 10,000 gallons of said fracing fluid are injected per stage, said fracing fluid injection stages continuing thereafter at said 5000-10,000 gallon fracing fluid volume, said fracing fluid in said successive stages having said fine proppants suspended therein initially at a loading of from about 2 to about 4 pounds per gallon of fluid, said proppant loading being incrementally increased by from about 0 to about 3 pounds of said proppant per gallon of fracing fluid to a proppant loading of from about 8 to about 12 pounds per gallon of fracing fluid, said injection of said fracing fluid injection stages thereafter continuing at said 8-12 pounds per gallon proppant loading until the following quantities of said proppants have been deposited in the formation:

| for | $5 \leq h < 10$, $m \geq$ | 500,000; |
| for | $10 \leq h < 15$, $m \geq$ | 750,000; |
| for | $15 \leq h < 20$, $m \geq$ | 1,000,000; |
| for | $20 \leq h < 25$, $m \geq$ | 2,000,000; and |
| for | $h \geq 25$, $m \geq$ | 3,000,000; | wherein h is the vertical thickness of the coal seam in feet and m is the minimum quantity of said fine proppants in pounds deposited therein; and
injecting stages of from about 250 to about 1500 gallons each of acidizing solution through said perforations into the formation adjacent the well between said fracing fluid injection stages, each of said acidizing and said fracing fluid injection stages being injected at a rate of from about 15 to about 35 barrels per minute.

23. A gas-yielding subterranean earth formation, comprising:
a fractured subterranean gas-containing coal formation;
a well penetrating said fractured formation; and
the following quantity of proppants having a particle size distribution substantially between 60 and 140 mesh deposited in said fractured formation:

| for | $5 \leq h < 10$, $m \geq$ | 500,000; |
| for | $10 \leq h < 15$, $m \geq$ | 750,000; |
| for | $15 \leq h < 20$, $m \geq$ | 1,000,000; |
| for | $20 \leq h < 25$, $m \geq$ | 2,000,000; and |
| for | $h \geq 25$, $m \geq$ | 3,000,000; | wherein h is the vertical thickness of the coal seam in feet and m is the minimum quantity of said fine proppants in pounds deposited therein.

24. The formation of claim 23, wherein said proppants are substantially spherically shaped and have an average particle size of about 100 mesh.

25. The formation of claim 23, wherein said well has casing of at least 7 inches in nominal diameter adjacent said fractured formation.

26. The formation of claim 23, wherein said well includes tubing of at least $3\frac{1}{2}$ inches in nominal diameter in fluid communication with said well adjacent said fractured formation.

27. A method for fracturing a gas-containing subsurface coal formation penetrated by a well, comprising the steps of:
injecting a fracing fluid into the formation adjacent the well in a multiplicity of stages, said fracing fluid having suspended therein fine proppants with a particle size distribution substantially between 60 and 140 mesh, said fine proppants added to said fluid at a rate ranging from about 2 to about 12 pounds per gallon of said fluid;
injecting a proppant-free fluid into the formation adjacent the well immediately following each of said fracing fluid injection stages, said injections of said fracing fluid and said proppant-free fluid being at a rate of from about 15 to about 35 barrels per minute and continuing until at least 3000 pounds of said fine proppants have been deposited in the formation fracture per linear vertical foot of the formation;

subsequent to said injections, allowing the fractures formed in said injection steps to close on said proppants deposited therein; and repeating said injection steps until an additional 3000 pounds of said proppants have been deposited in said formation per linear vertical foot thereof.

28. The method of claim 27, wherein said fracture closure step comprises shutting in the well.

29. The method of claim 27, wherein said fracture closure step comprises producing gas from the well.

30. The method of claim 27, wherein said repetition of said injection steps is continued until the following quantity of said proppants has been placed in the formation:

| | | |
|---|---|---|
| for | $5 \leq h < 10$, | $m \geq 500,000$; |
| for | $10 \leq h < 15$, | $m \geq 750,000$; |
| for | $15 \leq h < 20$, | $m \geq 1,000,000$; |
| for | $20 \leq h < 25$, | $m \geq 2,000,000$; and |
| for | $h \geq 25$, | $m \geq 3,000,000$; | wherein h is the vertical thickness of the coal seam in feet and m is the minimum quantity of said fine proppants in pounds deposited therein.

* * * * *